United States Patent [19]

Satoh et al.

[11] Patent Number: 4,545,044

[45] Date of Patent: Oct. 1, 1985

[54] METHOD AND APPARATUS FOR OPTICALLY RECORDING AND REPRODUCING INFORMATION

[75] Inventors: Isao Satoh, Neyagawa; Tomio Yoshida, Katano; Shunji Ohara, Osaka; Kenji Koishi, Suita, all of Japan

[73] Assignee: Matsushita Electric Industrial Company, Limited, Japan

[21] Appl. No.: 408,698

[22] Filed: Aug. 16, 1982

[30] Foreign Application Priority Data

Aug. 18, 1981 [JP] Japan .................. 56-128939

[51] Int. Cl.[4] .................................. G11B 7/00
[52] U.S. Cl. .................................. 369/32; 369/54; 369/58; 369/111
[58] Field of Search .................. 369/32, 30, 124, 111, 369/59, 106, 116, 54, 58; 360/72.2; 365/234, 215; 346/76 L

[56] References Cited

U.S. PATENT DOCUMENTS

| | | | |
|---|---|---|---|
| 4,051,329 | 9/1977 | Blondet | 369/116 |
| 4,125,860 | 11/1978 | Ishii | 369/32 |
| 4,241,240 | 12/1980 | Shigematsu | 360/72.2 |
| 4,321,635 | 3/1982 | Tsuyuguchi | 369/32 |

FOREIGN PATENT DOCUMENTS 113137  9/1980  Japan ..................... 369/58

Primary Examiner—Alan Faber
Attorney, Agent, or Firm—Lowe, King, Price & Becker

[57] ABSTRACT

In an optical disc having a file region and a directory region for carrying various pieces of information or data, one or more designated information can be erased by irradiating a laser light beam on a corresponding region in the file region where the light beam is modulated by a superposing writing signal which may be a d.c. or a predetermined a.c. signal. When it is intended to renew the information, designated information is first read out and stored in an external memory prior to performing superposing writing. Meanwhile, the data is renewed and is then written on an unused region in the file region. The directory of the renewed data region is also written so that the renewed information will be read out by searching the new directory. In another embodiment of the invention, the information in the file region is not erased to renew the same, but its directory is erased by superposing writing. A new directory for a renewed information, which is written in unused region in the same manner as the above, is written so that the renewed information can be read out by using the new directory. When reproducing, an envelope of the reproduced signal is detected to see whether information can be read out or not. Thus, erased information is skipped to reproduce only unerased information.

14 Claims, 37 Drawing Figures

SECTOR #n   #n+1   #n+2

METHOD AND APPARATUS FOR OPTICALLY RECORDING AND REPRODUCING INFORMATION

BACKGROUND OF THE INVENTION

This invention relates generally to method and apparatus for optically recording and reproducing information in and from an optical disc, and more particularly, the present invention relates to method and apparatus with which it is possible to rewrite or renew prerecorded information or data.

In known optical disc recording and reproducing systems, a light beam, such as laser light, having a diameter of 1 micrometer or less is incident on a rotating disc having a photosensitive recording material layer thereon. As a result, information is recorded in the form of pits, i.e. concavo-convex portions, holes or light and shade portions. Namely, the energy of the laser light beam is converted into heat so that the optical characteristics, such as the reflection coefficient or the transmittance, are changed to record the information at a high density.

In order to keep accurately the positional relationship between an optical head and the optical disc irrespective of the variations in the optical head feeding mechanism or in the disc drive mechanism, one or more guide tracks which are optically detectable are provided so that tracking control can be effected. As one example of such a tracking control, coaxial or spiral guide tracks are made on the entire area of the information signal recording region on the optical disc where the guide tracks are made of grooves each having a width of approximately 0.5 micrometers and a depth which is approximately one eighth the wavelength of the light used for recording and reproducing information. As another example of tracking control, a servo track carrying a predetermined servo signal is made so that recording and reproducing will be performed along the servo track.

When using such an optical disc having one or more guide tracks, track addresses are assigned respectively to the guide tracks so that recording (writing) and reproducing (reading) of digital information or data can be performed at any desired places on the optical disc. The guide tracks are divided into a plurality of regions which are called sectors so that a unit of information is recorded or reproduced by designating a region or area defined by the track address and the sector address.

The track and sector addresses are recorded in a directory region also made on the optical disc so that the positional relationship between the optical head and a given portion of the disc can be controlled to write or read information on or from the given portion. When it is intended to make some changes in the prerecorded information, however, the prerecorded information cannot be simply erased as in a magnetic recording medium because optically changed portions cannot be restored to the original state. For this reason, when it is desired to rewrite or edit prewritten information on an optical disc, the information has to be read out first from where it has been recorded to be editted, and then the editted or corrected information has to be recorded on a portion where no information has been recorded yet. In other words, the same portion or area on the optical disc cannot be used for repetitive recording. When rewriting or editting, which will be referred to as renewing hereafter, it is necessary to employ an external nonvolatile storage, such as a magnetic disc or the like, to store directories of various pieces of information or data prewritten in an optical disc. Each directory includes a track address and a sector address of a portion or region on an optical disc so that a particular region can be found to reproduce or read data therefrom.

Each of the directories has an identification name or code to constitute an index so that a given unit of information or data can be read out by designating a predetermined identification. Identifications with which directories of information pieces are designated should not be changed even if the contents of information are renewed so that the renewed information can be read out with its original identification. Therefore, in conventional optical recording systems, when one or more pieces of information prerecorded in an optical disc are to be renewed by writing the editted information on an unused portion on the disc, the corresponding directory or directories have to be changed and stored in the external storage again. Namely, in the conventional technique of renewing data on an optical disc, a nonvolatile external storage is needed for each disc to keep the directories of all pieces of information recorded in an optical disc. Accordingly, optical discs have to be used with associated nonvolatile external storages in pairs. For this reason, it has been difficult to handle optical discs. Furthermore, since it has been impossible to erase prewritten information from an optical disc, optical discs have to be kept with care so that secret information once written is not read out by others.

SUMMARY OF THE INVENTION

The present invention has been developed in order to remove the above-described drawbacks caused by the conventional optical recording and reproducing systems.

It is, therefore, an object of the present invention to provide apparatus for optically recording and reproducing information on and from an optical disc, with which apparatus prewritten information or data can be renewed without employing a nonvolatile external storage for storing directories of pieces of information prewritten in an optical disc.

According to a feature of the present invention, a laser light beam modulated by a predetermined d.c. or a.c. signal is applied to a given region on an optical disc so that superposing writing is effected to substantially erase prewritten information.

According to another feature of the present invention an output signal from an optical head responsive to light reflected at an optical disc is detected so that erased portions or regions can be distinguished from unerased regions to skip erased regions on reading.

According to another feature of the present invention a given piece or pieces of information can be ruined so that they cannot be read out even if the optical head is correctly accessed by some means, thereby protecting secret information.

In accordance with the present invention there is provided apparatus for optically recording and reproducing information comprising: first means for driving an optical disc; second means for emitting laser light beam so that the beam is incident on said disc; third means for modulating said laser light beam in accordance with an information signal; fourth means for driving said second means; fifth means for controlling said first to fourth means so that information is written on a file region on said optical disc, while directory of said region is also written in a directory region; sixth means for generating a superposing writing signal; seventh means for modulating said laser light beam by said superposing writing signal; eighth means responsive to light reflected at said disc; and ninth means for detecting a region on which said laser light beam modulated by said superposing writing signal has been irradiated from the output signal from said eighth means; said fifth means being responsive to an output signal from said eighth means so that region or regions, on which said laser light beam modulated by said superposing writing signal has been irradiated, are skipped when reproducing information from said optical disc.

In accordance with the present invention there is also provided a method of renewing information prewritten on an optical disc having a file region and a directory region, comprising the steps of: searching directory of a designated data to be renewed; reading out said data to renew the same; storing said directory in a memory; erasing said data prewritten on said disc by superposing writing which is effected by irradiating a laser light beam on a corresponding region on said file region, where said laser light beam is modulated by a predetermined d.c. or a.c. signal; searching the last position of data prewritten on said disc; writing the renewed data in an unused region which follows said last position; renewing the directory stored in said memory so that a new directory designates the position where said renewed data has been written; searching the last position of directories which are prewritten in said directory region; and writing said new directory at an unused region in said directory region which follows said last position of directories.

In accordance with the present invention there is also provided a method of renewing information prewritten on an optical disc having a file region and a directory region, comprising the steps of: searching directory of a designated data to be renewed; reading out said data to renew the same; storing said directory in a memory; erasing said directory prewritten on said disc by superposing writing which is effected by irradiating a laser light beam on a corresponding region in said directory region, where said laser light beam is modulated by a predetermined d.c. or a.c. signal; searching the last position of data prewritten on said disc; writing the renewed data in an unused region which follows said last position; renewing the directory stored in said memory so that a new directory designates the position where said renewed data has been written; searching the last position of directories which are prewritten in said directory region; and writing said new directory at an unused region in said directory region which follows said last position of directories.

In accordance with the present invention there is further provided a method of reading out information prewritten on an optical disc having a file region and a directory region, comprising the steps of: detecting a reproduced signal to check the envelope thereof so that it can be ascertained whether information in each region can be read out or not; and reading out information from each region by skipping one or more regions when it has been detected that information therein cannot be read out.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1A:
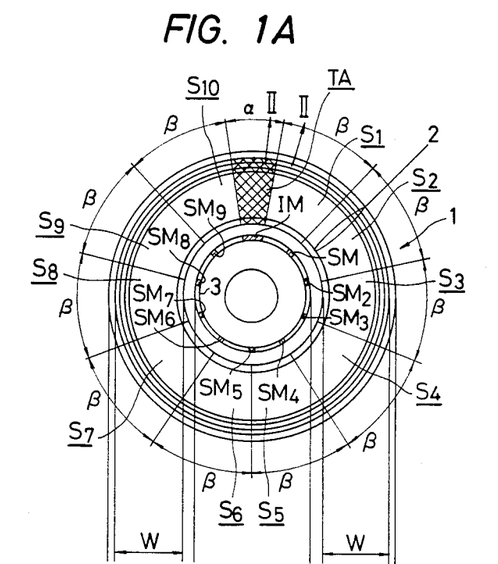
FIGS. 1A and 1B are a top plan view and a side view of an example of an optical disc which is used in the recording and reproducing apparatus according to the present invention.
Figure 1B:
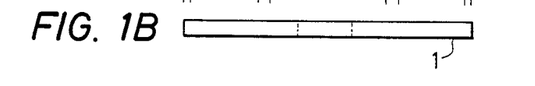

Referring now to FIGS. 1A and 1B an example of an optical disc 1, which is used in the recording and reproducing apparatus according to the present invention, is shown. The disc 1 is made of the same material as those of conventional optical discs. Spiral or coaxial tracks 2 are formed on the optical disc 1 and it is shown that the tracks 2 are divided into a plularity of information regions or sectors S1 to S10 and a track address region TA. Each of the information regions S1 to S10 is equiangularly arranged at an angle $\beta$ so that information will be recorded and reproduced to and from each sector. The sectors are distinguished from each other by using sector marks SM1 to SM9 and an index mark IM both coaxilly provided at the inner most portion of the disc 1. The index mark IM is radially alinged with the track address region TA both having an angle α when viewed from the center of the disc 1. The index mark IM will be used to designate the track address region TA and to indicate the starting point for counting the sector number. In FIG. 1, the reference W indicates an effective recording region within the coaxial tracks 2.

Figure 2A:
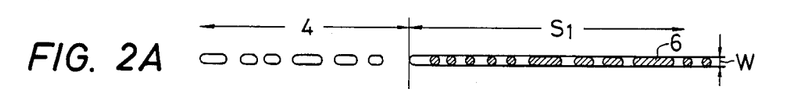
FIGS. 2A to 2C are explanatory diagrams showing the detailed structure of the optically changed portion on or along a single track corresponding to a portion defined by the line II—II in FIG. 1A.
Figure 2B:
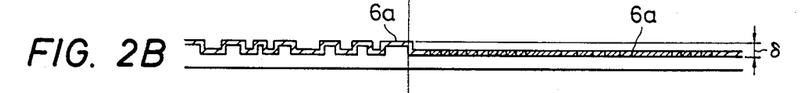
Figure 2C:
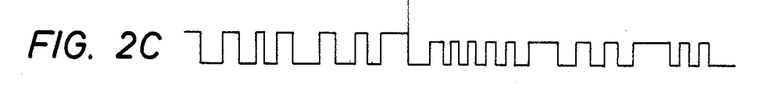

FIGS. 2A to 2C are explanatory diagrams showing the detailed structure of the optically changed, i.e. recorded portion on or along a single track 2 corresponding to a portion defined by the line II—II in FIG. 1A. FIG. 2A is a top plan view; FIG. 2B is a cross-sectional view; and FIG. 2C is a waveform chart corresponding to the track portion illustrated in FIGS. 2A and 2B. In FIGS. 2A and 2B, the reference 4 indicates a track address portion of the track address region TA, while the reference 6 indicates a guide track of the sector S1. The guide track 6 is formed by a flat groove which extends coaxially, and the width and depth of the guide track 6 are respectively expressed in terms of w and δ. This depth δ is selected to be substantially equal to one eighth the wavelength of the laser light beam so that a tracking signal for controlling a tiny light spot will be readily obtained. The track address portion 4 is formed when manufacturing the disc 1. Namely, a given pit pattern is cut in the original or master disc so that the same pit pattern is copied by well known stamping techniques.

As best seen in the cross-sectional view of FIG. 2B, a metallic film or the like is vapor deposited on both the address track portion 4 and the guide track 6 to provide a recording or writing layer 6a. Information recording is actualized by either making holes in the recording layer 6a or changing the optical characteristics thereof in the same manner as in conventional optical disc recording techniques. Such recording techniques are known by the name of heat mode recording. Prerecorded signals will be derived or picked up from the recording layer 6a with a light beam whose power is low such that it is below the threshold for sensitization of the recording layer 6a. Thus, the intensity of reflected light will be detected so that a reproduced signal will be obtained as shown in FIG. 2C.

In the track address portion 4, since track address information has been prerecorded in the form of phase structure, the track address information will be reproduced by using the variation in the intensity of the reflected light which is obtained when a light spot of 1 micrometer is diffracted at the concavo-convex portion of the track address portion 4. Because of the difference in recording forms the amplitude of the reproduced signal corresponding to the track address portion 4 is different from that of the reproduced signal corresponding to the guide track 6.

Figure 3:
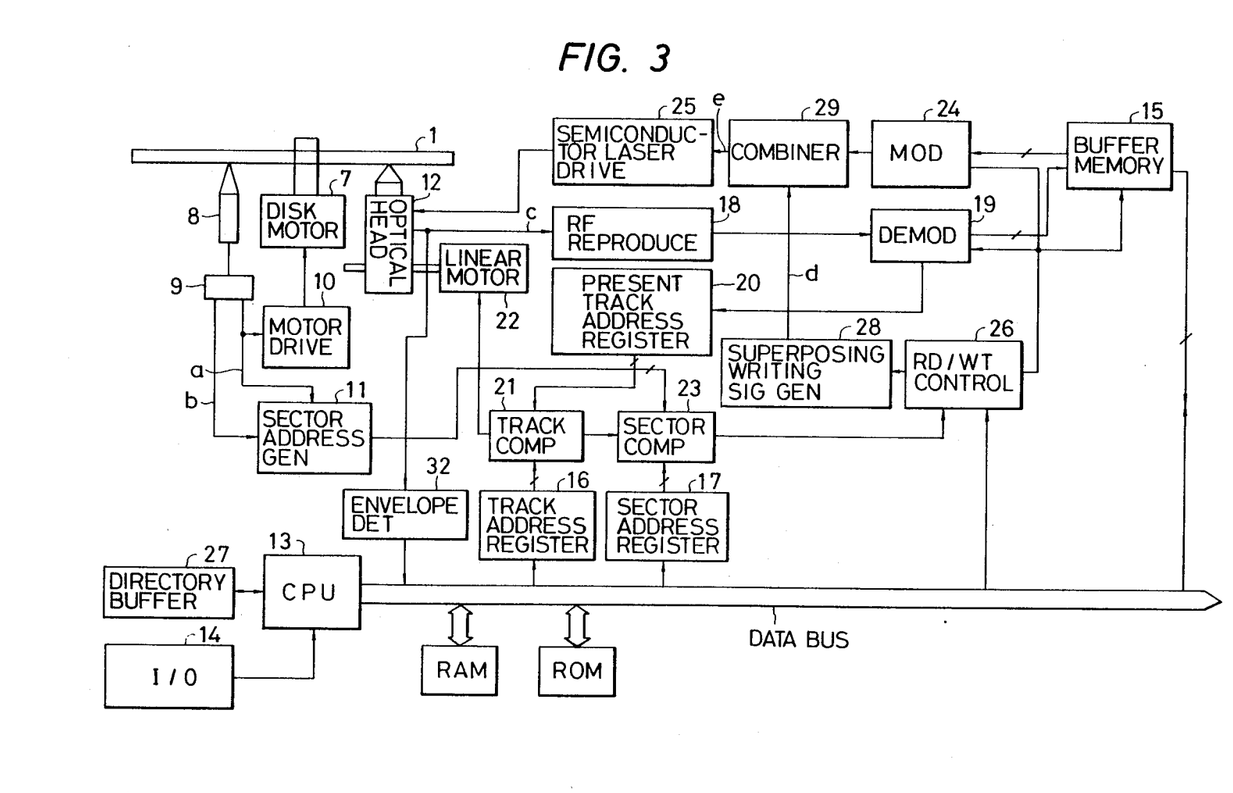
FIG. 3 is a schematic block diagram of an embodiment of the apparatus for optically recording and reproducing information according to the present invention.

FIG. 3 illustrates a schematic block diagram of an embodiment of the apparatus for optically recording and reproducing information according to the present invention. The apparatus of FIG. 3 is arranged, as will be described in detail hereafter, to write and read information or data on or from a designated sector, and to renew or rewrite a designated sector.

The apparatus comprises a disc motor 7 so that the optical disc 1 is rotated stably. A sector position detector 8 comprises a light-emitting element and a photosensitive element to form a reflected light detector, and is arranged to detect light reflected at the sector marks SM1 to SM10 and at the index mark IM which are coaxially arranged as shown in FIG. 1A. An output signal from the sector position detector 8 is fed to a separation circuit 9 in which an index signal "a" and a sector signal "b" are separated from each other. The index signal Sa is then fed to a disc motor driving circuit 10 so that synchronization of the disc motor 7 will be obtained.

The sector signal Sb is fed to a sector address generating circuit 11 in which counting is effected so as to designate a sector address of an optical head 12.

Writing or recording in a sector of the optical disc 1 will be performed as follows. Data to be written is fed from an input/output device 14 to a buffer memory 15 under the control of a computer or central processing unit (CPU) 13 as much as the capacity of a single sector. The CPU 13 sets a writing track address in a track address register 16, and a writing sector address in a sector address register 17. After this the CPU 13 produces a write instruction. On the other hand, a read out signal from the optical head 12 is waveform equalized and pulse shaped in an RF reproducing circuit 18, and a present track address is demodulated in a demodulator 19, and is then stored in a present track address register 20. The present track address will be compared with a writing track address from the track address register 16 in a track address comparator 21. When these two data are not equal to each other, a linear motor 22, which feeds the optical head 12 at a high speed, is driven as much as the difference therebetween. When the optical head 12 accesses a writing track, comparison between a present sector address and the writing sector address is effected in a sector address comparator 23. When these two sector addresses are equal to each other, the output of the buffer memory 15 is modulated by a modulator 24 to be fed to a semiconductor laser driving circuit 25. The semiconductor laser driving circuit 25 modulates the intensity of the laser light beam emitted from a semiconductor laser built in the optical head 12 so that writing on the optical disc 1 is performed. With this modulation holes or light and shade patterns are made on the recording layer of the disc 1 resulting in variation in reflection coefficient. When reading out prerecorded data, the output power level of the semiconductor laser is set to be lower than that on writing so that the level is below the threshold for sensitization of the recording layer 6a. A read/write control circuit 26 controls the timing of writing the data of the buffer memory 15 into a sector and reading out, and also controls the switching of the level of the output power of the semiconcutor laser.

When reading out from a sector, a given sector is designated by setting a reading track address and a reading sector address in the same manner as in writing. When a reading sector is detected, a read out signal, which is pulse shaped in the RF reproducing circuit 18, is then demodulated into data in a demodulator 19. After demodulation, the read out data is written in the buffer memory 15. Nextly, the read out data written in the buffer memory 15 is fed to the data input/output device 14 by the CPU 13.

The reference 27 designates a directory buffer in which index information of the data written in the optical disc 1 is temporarily stored, and this directory buffer 27 is arranged to write the index information in a directory region of the optical disc 1 when the amount of the same equals the maximum amount of data which can be written in a single sector.

Prewritten information will be renewed as will be described hereinbelow. As described in the above, since information is recorded as the change in optical characteristics in the optical disc 1, erasure of the prerecorded information cannot be effected in the same manner as in magnetic recording media. In the present invention, therefore, one or more sectors in which information to be renewed has been prerecorded, are made impossible to be read out, and then renewed information is written in one or more unused sectors. In other words, only renewed information can be read out while old information has been ruined so that the apparatus according to the present invention functions as if old information, which is no longer needed after renewal, were erased from the disc 1. This is achieved by writing a signal on a sector in which information to be renewed has been written. This way of writing doubly is referred to as superposing writing hereafter. In the following description, the word "erasing" is used to mean that prewritten information is made to be unreadable because of superposing writing.

Figure 4A:
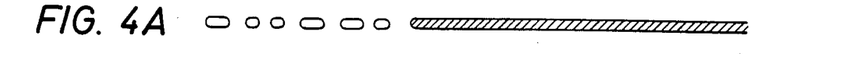
FIGS. 4A, 4B, 4C, and 4D show a recording state in a sector whose information is to be erased.
Figure 4B:
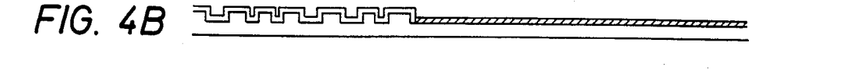
Figure 4C:
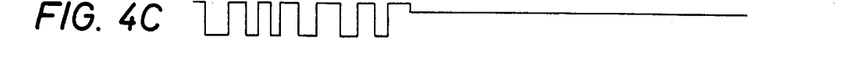
Figure 4D:
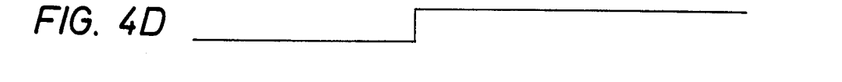

When it is intended to erase information in a given sector, a superposing signal "d" from a superposing signal generating circuit 28 is fed via a superposing writing combiner 29 to the semiconductor laser driving circuit 25. FIGS. 4A and 4B show a recording state in a sector whose information is to be erased. When a superposing signal of a d.c. like state, of FIG. 4D is recorded on a prewritten sector, the state of pits on the track is made uniform as shown in FIGS. 4A and 4B along the track. As a result, when the erased sector is scanned by the optical head 12 to reproduce information therefrom, the reproduced signal takes a waveform as shown in FIG. 4C having no information. Therefore, originally written information can be regarded as if it has been erased. A signal to be superposed is not limited to the above-mentioned d.c. like signal.

Figure 5A:
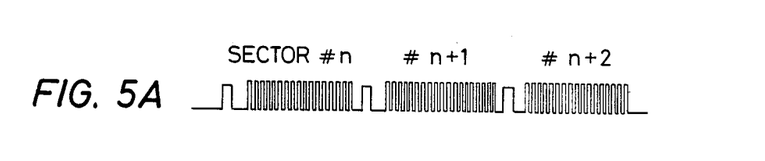
FIGS. 5A to 5D are waveform charts useful for understanding various signals with which a laser light beam is modulated to substantially erase prerecorded information.
Figure 5B:
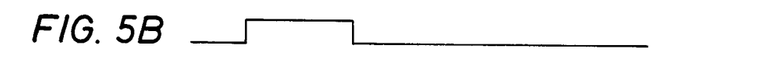
Figure 5C:
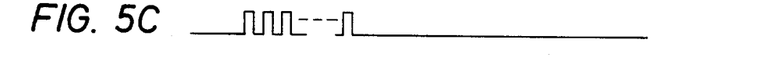
Figure 5D:
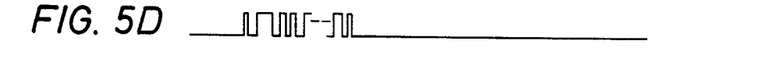

Other examples of superposing signals will be described with reference to FIGS. 5A to 5D. FIG. 5A shows a waveform of a reproduced signal from consecutive sectors whose numbers are #n, #n+1 and #n+2. FIG. 5B shows a d.c. signal as a superposing signal in the same manner as in FIG. 4D. FIG. 5C shows an a.c. signal having a constant frequency. FIG. 5D shows an a.c. signal having a random period. When an a.c. signal is to be superposed, it is preferable to select the frequency thereof to be below one half the demodulating frequency so that perfect erasing by superposing writing is insured.

In the above described embodiment, although erasing or superposing writing is effected with respect to one or more sectors, such erasing may be effected with respect to one or more files when various data is written in the optical disc 1 in each file made therein. The following embodiment is useful for renewing data of a file which is controlled under a directory provided on the disc 1.

Figure 6:
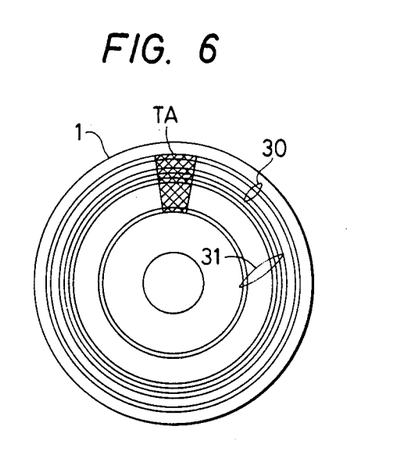
FIG. 6 is a schematic top plan view of an optical disc having a directory region and a file region.

The optical disc 1 shown in FIG. 6 has a directory region 30 at the outermost portion and a file region 31 in an inner portion. The addresses of the tracks on the disc 1 are written in a track address region TA, while sectors constituting the tracks are not shown for simplicity. The directory region 30 is used for providing an index for each of the recorded files.

Figures 7A, 7C:
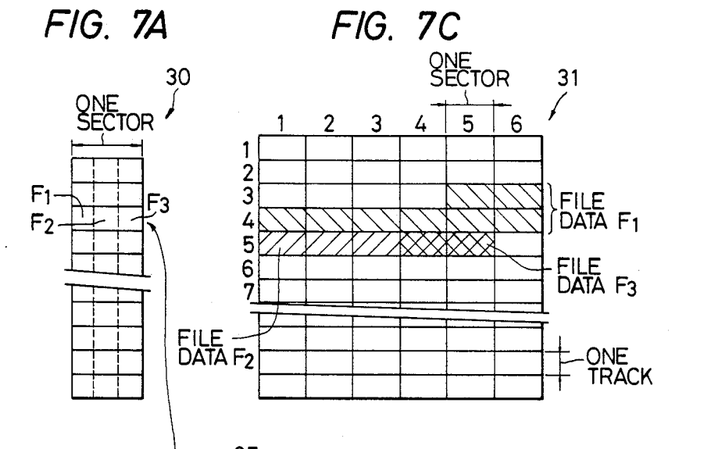
FIGS. 7A, 7B and 7C are explanatory diagrams showing a recorded state of a plurality of files which are prewritten or registerd in the optical disc of FIG. 6.
Figure 7B:
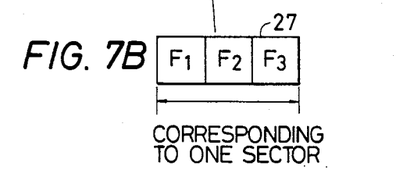

FIGS. 7A, 7B and 7C are explanatory diagrams for the recorded state of files F1, F2 and F3 which are prewritten or registered in the optical disc 1 of FIG. 6. In detail, FIG. 7A shows the directory region 30 of FIG. 6; FIG. 7B shows the contents of the directory buffer 27 of FIG. 3; and FIG. 7C shows the file region 31. In the directory region 30, directories of the files F1 to F3 are written. Here the directory means information indicative of the position of the corresponding file, such as F1, F2 or F3, each written in the file region 31 as shown in FIG. 7C. Each of the directories includes a head track address, a head sector address, the last track address, a last sector address and various indicating information, such as labels, dates and comments. The directory region 30 will be used, therefore to search a desired file prewritten in the optical disc 1.

FIGS. 7A to 7C show an example where the capacity of a unit sector is large so that a plurality of directories can be registered. In order to register a plurality of directories in the directory region 30, the directory buffer 27 of FIG. 3 is arranged to store therein the plurality of directories. All the directories temporarily stored in the directory buffer 27 will be written simultaneously when the directory buffer 27 is filled so that a plurality of directories can be registered at once. However, if desired, each directory may be written one by one.

Figures 8A, 8B, 8C:
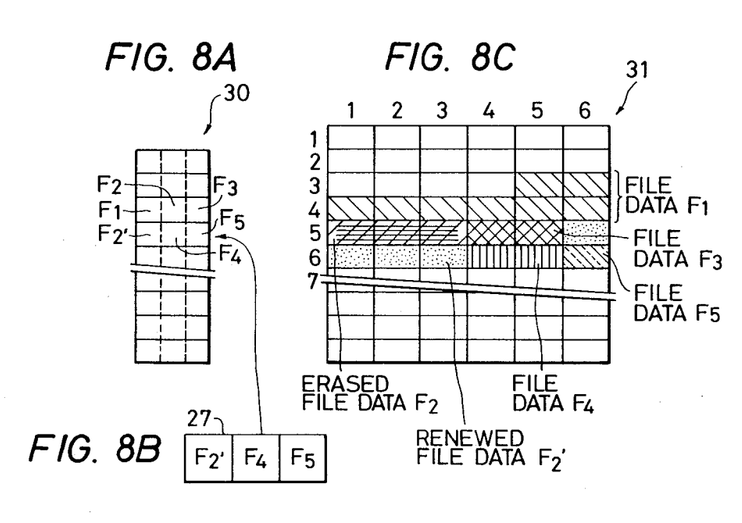
FIGS. 8A, 8B and 8C are explanatory diagrams useful for understanding an embodiment of the way of renewing one of the files in the optical disc of FIG. 6.
Figure 9:
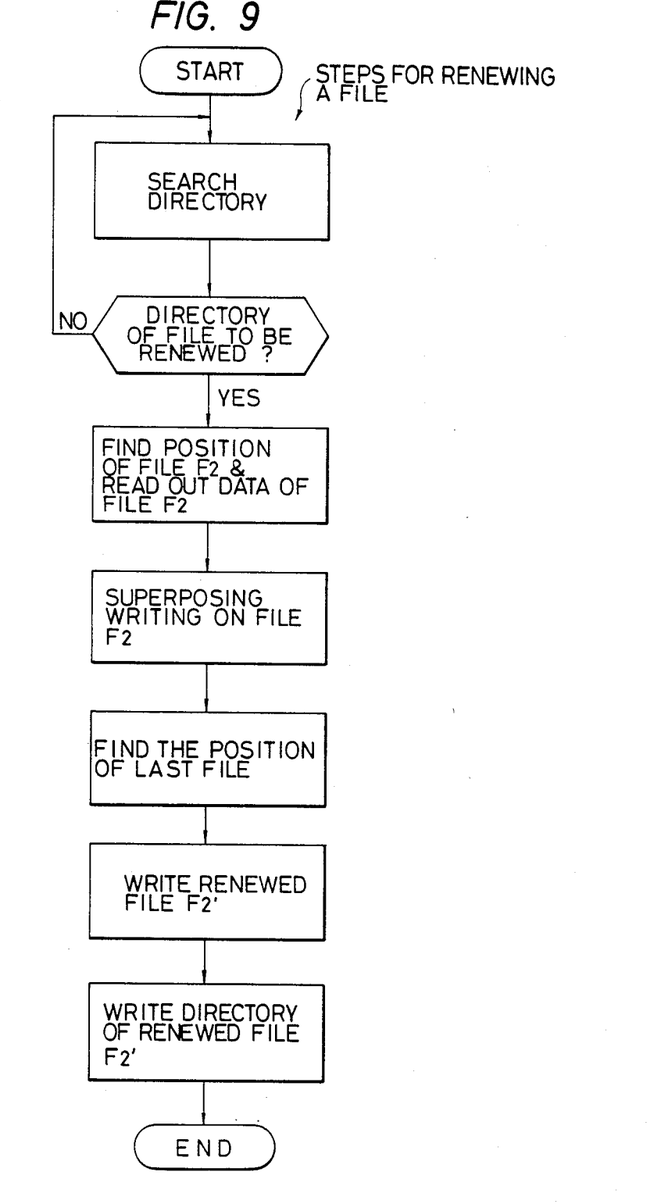
FIG. 9 is a flowchart showing the steps for renewing a file in accordance with the embodiment of FIGS. 8A to 8C.
Figure 10:
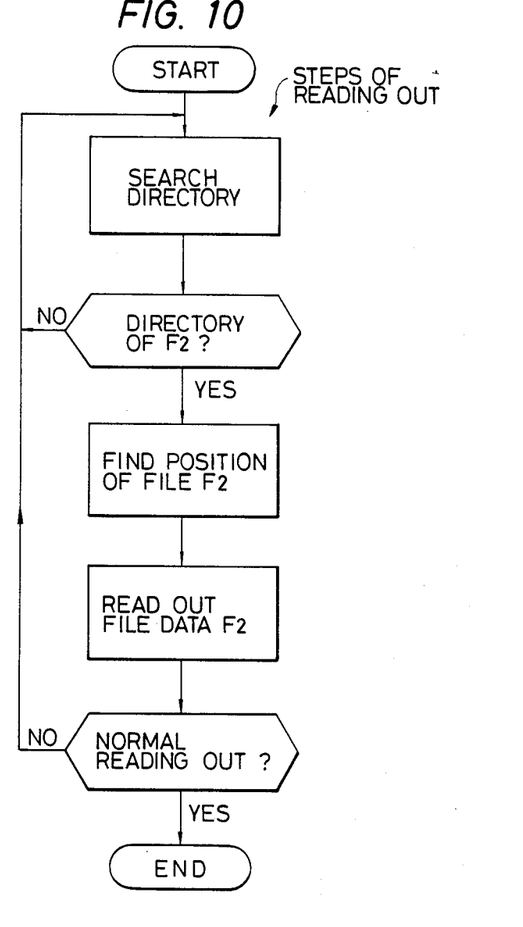
FIG. 10 is a flowchart showing the steps for reproducing or reading a renewed file in accordance with the embodiment of FIGS. 8A to 8C.

It will be described how a file is renewed with reference to FIGS. 8A to 8C showing the state of recording in the same manner as FIGS. 7A to 7C. Let us assume that it is intended to renew or change the file F2 to F2'. FIGS. 9 and 10 are flowcharts for renewing a file and reading out a renewed file F2'. When an instruction of renewing the file F2 is present, the directory of the file F2 is searched so that the position of the file F2 in the file region 31 is detected. The data in the file F2 is read out and is stored in an external storage, such as a magnetic disc or the like. Then the aforementioned erasing is effected in connection with the file F2. Namely, an erasing signal or superposing signal is written on the prewritten information of the file F2 so that the file F2 will not be able to be read out.

The contents of the file F2 stored in the external storage will be renewed or exited so that the contents of the data are ready to be written in the optical disc 1 again. The renewed file is designated at a reference F2'. After erasing, the last sector of the last file registered in the file region 31 is detected so that the renewed file F2' will be written in an unused sector which follows the last sector. Subsequently, the directory of the renewed file F2' is stored in the buffer memory 27. When only a single file is renewed, namely, only the file F2 is changed to F2' as described in the above, the directory of the renewed file F2' stored in the directory buffer 27 is written in the directory region 30. On the other hand, when other files are also renewed or new files such as F4 and F5 are to be added, the directories of these files are also stored in the directory buffer 27 together with the directory of the file F2'. Suppose new files F4 and F5 are to be added, the directories of these files F4 and F5 are stored in the directory buffer 27 together with the directory of the renewed file F2' as shown in FIG. 8B. In this case, each of the directories is not written in the directory region 30 one by one but all the directories are simultaneously written when the directory buffer 27 is filled as described in the above. The above described steps for renewing a file are shown in the flowchart of FIG. 9, and are executed by the control of the CPU 13 of FIG. 3.

Renewed file or files will be read out from the optical disc 1 in the following manner. When an instruction of reading out the file F2 is present, the directory of the file F2' is searched so that the position of the file F2, which has been erased as described in the above, is detected. Thus the optical head 12 is directed to a position where the file F2 has been written. However, the file data of the old file F2 cannot be read out because of the above-mentioned superposing writing. The impossibility of reading out will be detected as will be described in detail hereinafter, and thus it will be ascertained that the file F2 has been renewed. Therefore, the directory of the renewed file F2' is then searched to obtain information of the position of the renewed file F2'. With this directory information the optical head 12 is directed to the right position of the renewed file F2' to read out the file data therefrom. At this time it is detected whether the reading operation is normal or not. If it is abnormal, the step of directory searching is again executed. This normal/abnormal detection may be performed by detecting the address mark which indicates the head of the data portion of the corresponding sector. However, this system of normal/abnormal detection has a chance of erroneously detecting the address mark due to defects of the optical disc 1. Therefore, it is necessary to ascertain that no error occurs immediately after data has been written on the optical disc 1.

Figure 11:
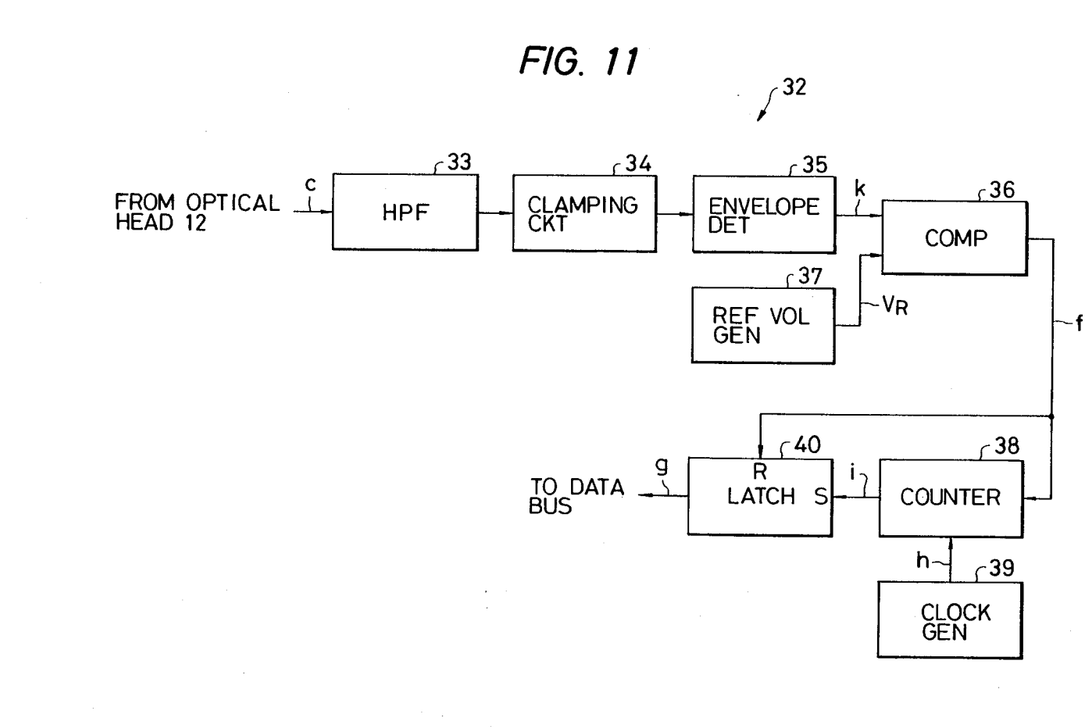
FIG. 11 is a schematic block diagram of the envelope detecting circuit shown in FIG. 3.

FIG. 11 illustrates a block diagram of an embodiment of the envelope detecting circuit 32 of FIG. 3, which envelope detecting circuit 32 is used to detect the impossibility of reading out the prewritten information or data. Namely, the envelope detecting circuit 32 is responsive to the frequency of the read out signal so that it is ascertained whether the read out signal includes information or not. FIGS. 12A to 12E show various waveforms useful for understanding the operation of the envelope detecting circuit 32 of FIG. 11, and the operation of the envelope detecting circuit 32 will be described with FIGS. 11 and 12A to 12E.

Figure 12A:
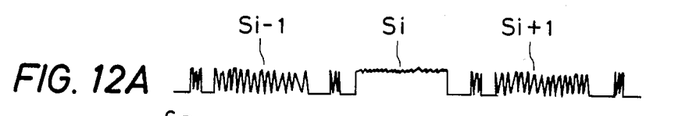
FIGS. 12A to 12E are waveform charts useful for understanding the operation of the envelope detecting circuit of FIG. 11.
Figures 12B, 12C, 12D:
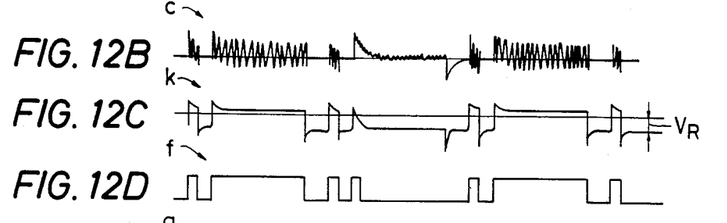
Figure 12E:
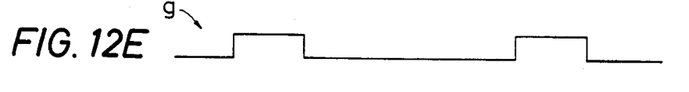

FIG. 12A shows the state of variation in the amount of light reflected at prerecorded sectors $Si-1$, $Si$ and $Si+1$ where information in one sector $Si$ has been erased by superposing writing. In FIGS. 11 and 12B, the output signal from the optical head 12 is designated at the reference "c", and it is to be noted that the output signal "c" takes a waveform as shown in FIG. 12B because of an a.c. amplifier built in the optical head 12. In other words, a d.c. component in the reflected light variation is lost when the output signal from a photosensitive element is passed through the a.c. amplifier. A high pass filter 33 is responsive to the output signal "c" from the optical head 12 so that a low frequency component included in the read out signal "c" is suppressed. The output signal from the high pass filter 33 is fed to a clamping circuit 34 in which d.c. restortion is effected, so that the level of an envelope detecting signal will be large. The output signal from the clamping circuit 34 is fed to an envelope detector 35 which produces an envelope signal "k". This envelope signal "k" has a waveform as shown in FIG. 12C, and is fed to a comparator 36 which also receives a reference voltage $V_R$ from a reference voltage generator 37. As a result of the comparison, the envelope signal "k" is converted into a binary signal "f" as shown in FIG. 12D. The output signal "f" from the comparator 36 is fed to an ENABLE terminal of a counter 38 which is arranged to count the number of clock pulses "h" fed from a clock pulse generator 39. The output signal "f" is also fed to a RESET terminal R of a S-R latch 40. The counter 38 is arranged to count the number of the clock pulses "h" when the output signal "f" of the counter assumes logic "1", and when the count reaches a predetermined value, the output signal "i" of the counter 38 is set to logic "1". In the presence of logic "1" from the counter 38 the latch 40 is set to logic "1". The latch 40 is arranged to be cleared when the output signal "f" from the comparator 36 becomes logic "0". FIG. 12E shows a waveform of the output signal "g" from the latch 40, which output signal is the above-mentioned envelope detection signal "g". As seen in FIG. 12E, no envelope detection signal "g" is emitted when scanning the sector $Si$ whose information has been erased by superposing writing, while envelope detection signals "g" of logic "1" are emitted when scanning other sectors $Si-1$ and $Si+1$ from which written information can be read out. From the above it will be understood that erased or doubly written sectors can be distinguished from unerased sectors by the envelope detection signal "g" from the envelope detecting circuit 32.

Figure 13A:
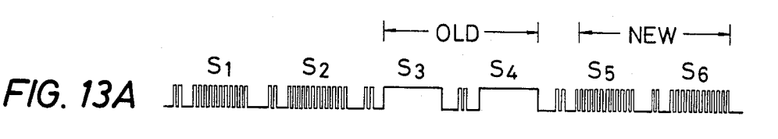
FIGS. 13A to 13C are waveform charts useful for understanding how a renewed information is read out.
Figure 13B:
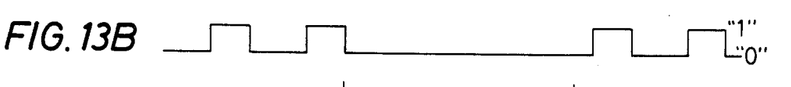
Figure 13C:
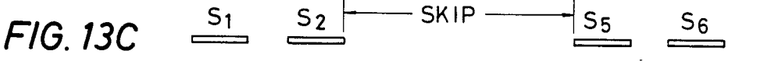

Now it will be described how the renewed data, which has been written into an unused sector with old data being erased, is read out from the disc 1. FIGS. 13A to 13C show the state in which a file prewritten into sectors S1 to S4 is renewed by rewriting the data of sectors S3 and S4 into unused sectors S5 and S6 so that a new file is made in a region comprising the sectors S1, S2, S5 and S6. Old data written in the sectors S3 and S4 have been erased by superposing writing so that the data therein cannot be read out. FIG. 13A is a waveform chart showing the amount of light reflected at the disc 1, and it will be understood that the intensity of reflected light from the sectors S3 and S4 is constant due to superposing writing.

Figure 14:
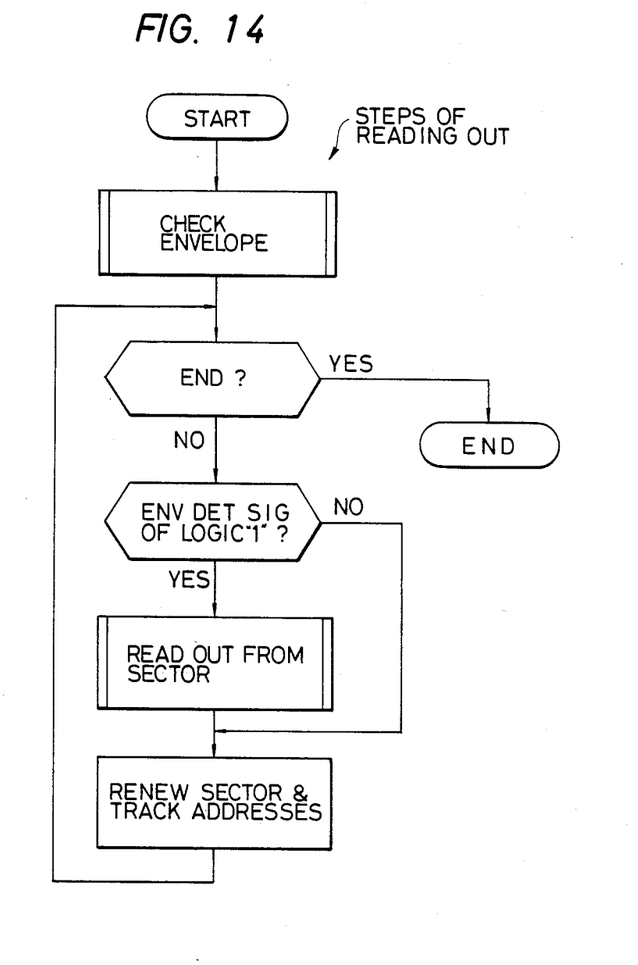
FIG. 14 is a flowchart showing the steps for the reading operation.

Reading operation is effected in accordance with a flowchart of FIG. 14. Namely, an envelope check is effected at the beginning to detect whether data in each sector can be read out by the optical head 12. FIG. 13B shows a waveform of the envelope detection signal "g" corresponding to the sectors S1 to S6. The logic state of the envelope detection signal "g" is detected by the CPU 13, and the results of detection are stored in a memory such as RAM. Then it is detected whether the logic state of the envelope detection signal "g" is of logic "1" or "0" for each sector from S1 to S6. With this checking it can be ascertained that the envelope detection signal "g" assumes logic "1" with respect to the sectors S1, S2, S5 and S6. Therefore, the sectors S3 and S4 whose envelope detection signal "g" assumes logic "0" are skipped when scanning and reading by the optical head 12. FIG. 13C shows the way of reading out data from the sectors S1, S2, S5 and S6. Thus, data in these sectors S1, S2, S5 and S6 is read out in a sequence. In order to detect the logic state of the envelope detection signal "g" for each sector, the contents of the RAM are read out each time data from a single sector is to be read out as indicated in the flowchart of FIG. 14.

In the above described embodiment, although a d.c. signal is used as the superposing signal "d", an a.c. signal having a pulse width which is greater than twice the minimum pulse width (smallest pit width) of the modulation signal "e", may also be used instead of the d.c. signal so that erased sectors can be distinguished from unerased sectors.

In the above embodiment, file data is renewed by erasing corresponding sector or sectors by superposing writing technique so that erased sectors can be distinguished from unerased sectors by using the envelope detection signal "g". However, file data in the file region 31 does not necessarily have to be erased to effect renewing. In a following embodiment, another technique of renewing one or more files will be described.

Figure 15A:
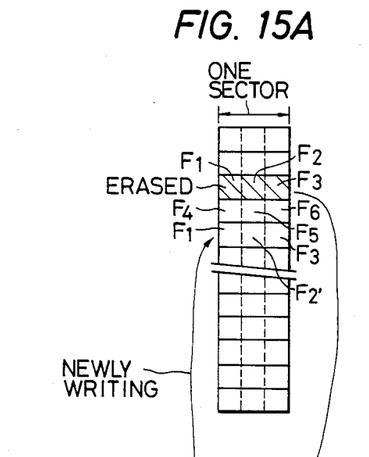
FIGS. 15A, 15B and 15C are explanatory diagrams useful for understanding another embodiment of the way of renewing one of the files in the optical disc of FIG. 6.
Figure 15B:
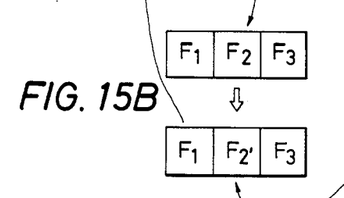
Figure 15C:
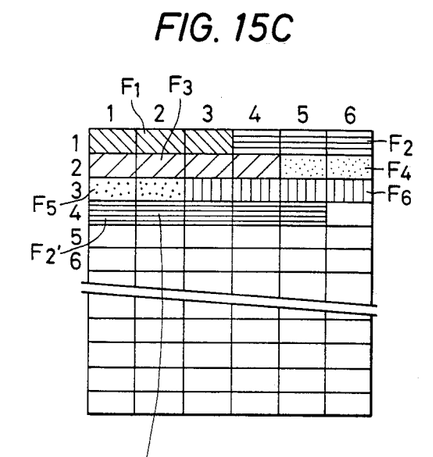
Figure 16:
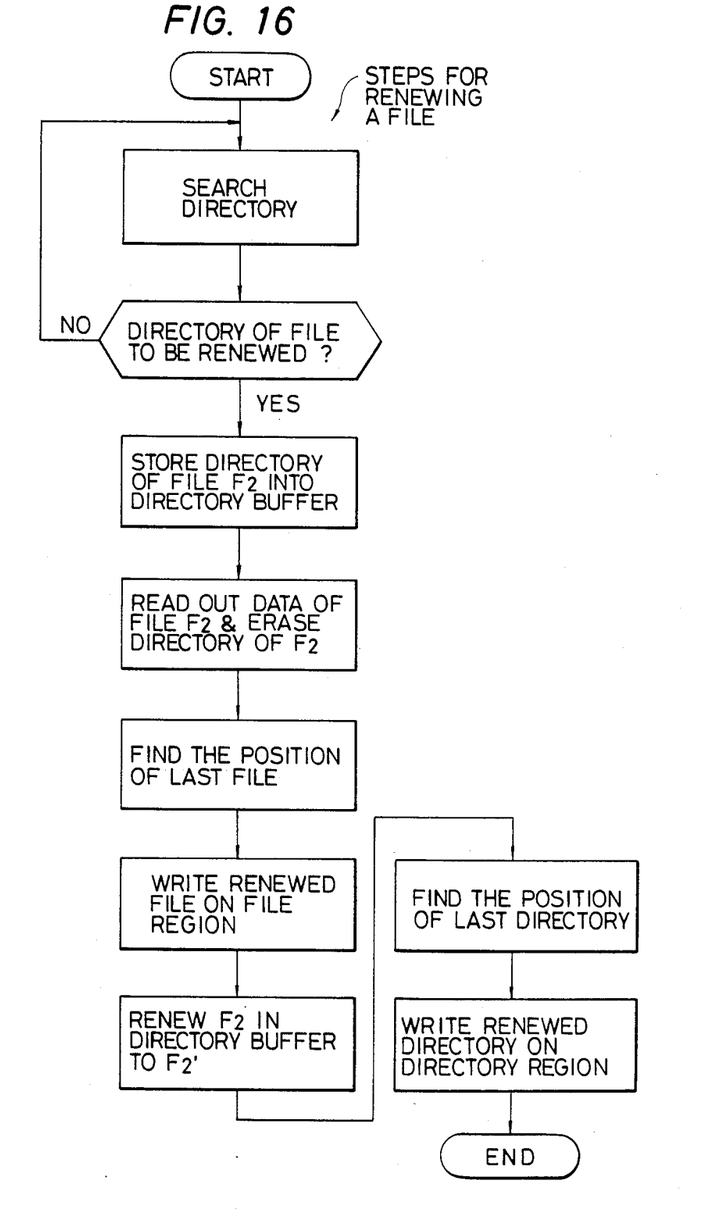
FIG. 16 is a flowchart showing the steps for renewing a file in accordance with the embodiment of FIGS. 15A to 15C.

In this embodiment, a corresponding directory regions is erased instead of erasing corresponding file data in the file region 31. FIGS. 15A, 15B, 15C and 16 show how a corresponding directory region is erased to renew a file. FIGS. 15A, 15B and 15C are similar to FIGS. 8A, 8B and 8C, while FIG. 16 is a flowchart. Suppose a file F2 is to be renewed, the directory of the file F2 is copied to the directory buffer 27, and then the directory region of the file F2 is erased. As shown in FIG. 15A, since directories of three consecutive files F1, F2 and F3 are all written in a single track of the same sector, all these directories are temporarily stored in the directory buffer 27. Subsequently, the directories of the files F1, F2 and F3 are erased by superposing writing (see hatched portion in FIG. 15A). The data of the file F2 is read out and temporarily stored in an external memory in the same manner as described in connection with the above embodiment, and then the file data F2 is renewed to be a renewed file data F2'. This renewed file data F2' is then written in unused file region after detecting the last position of file data on the disc 1. When writing the renewed file data F2' is over, the directory of the file F2 is changed or renewed to a new directory which indicates the position of the filed data F2'. Namely, the contents of the directory buffer 27 are read out and changed so that renewed directory or directories designating the renewed file F2' are stored therein. The last position of the directories in the directory region 30 is detected so that the renewed directory of the file data F2' is written. In the embodiment illustrated in FIGS. 15A to 15C, directories of three files are handled together where only the directory of the file F2 is changed to a new one.

From the above, it will be understood that the above-described embodiment is advantageous because there is no need to actually erase file data proper to cause the file data to be apparantly erased. Accordingly, file data can be treated as if it has been erased or cancelled from the optical disc 1 within a short period of time because only the corresponding directory is erased and renewed.

From the foregoing it will be understood that information or data prerecorded or prewritten in an optical disc can be selectively made impossible to be read out as if it has been erased. It will be also recognized that there are two ways to renew file data; one is to actually erase the file data by superposing writing on a region where file data has been prewritten and to write renewed file data into an unused region; and the other is to erase and renew only the directory of the file data while renewed file data is written into an unused region. Since the present invention provides a technique for renewing file data in an optical disc from which recorded information cannot be cancelled as in a magnetic recording medium, various data in an optical disc can be readily handled and controlled. In other words, optical discs, which have been thought that only recording or writing can be effected but erasing cannot be effected, can be regarded as recording media from which prewritten data can be substantially erased. Especially, when data prewritten should be cancelled to keep its secret, the first mentioned technique of superposing writing on the file region is effective because the file data can be ruined so that there is no way to reproduce the prewritten data.

The above-described embodiments are just examples of the present invention, and therefore, it will be apparent for those skilled in the art that many modifications and variations may be made without departing from the spirit of the present invention.

What is claimed is:

1. Apparatus for optically recording and reproducing information comprising:
   (a) first means for driving an optical disc, said disc having guide tracks each divided into a plurality of sectors;
   (b) second means for emitting a laser light beam so that the beam is incident on said disc;
   (c) third means for modulating said laser light beam in accordance with an information signal;
   (d) fourth means for driving said second means;
   (e) fifth means for controlling said first to fourth means so that information is written on a file region on said optical disc in units of said sector, while a directory of said file region is also written in a directory region on said optical disc;
   (f) sixth means for generating a superposing writing signal;
   (g) seventh means for modulating said laser light beam by said superposing writing signal so that said superposing writing signal is recorded on a sector, in which information to be renewed or erased has been previously written, said writing signal superposed upon the prerecorded information thereby forming a predetermined pit pattern on said sector to destroy at least a portion of said prerecorded information;
   (h) eighth means responsive to light reflected at said disc; and
   (i) ninth means responsive to said eighth means for detecting a sector whose information has been destroyed;
   said fifth means being responsive to an output signal from said ninth means so that a sector or sectors whose information has been destroyed are skipped when reproducing information from said optical disc.

2. Apparatus as claimed in claim 1, wherein said ninth means comprises an envelope detecting circuit which detects the envelope of the output signal from said seventh means.

3. Apparatus as claimed in claim 2, wherein said envelope detecting circuit comprises:
   (a) a high pass filter responsive to the output signal from said eighth means;
   (b) a clamping circuit responsive to the output signal from said high pass filter;
   (c) an envelope detector responsive to the output signal from said clamping circuit;
   (d) a comparator responsive to the output signal from said envelope detector and to a reference voltage;
   (e) a clock pulse generator;
   (f) a counter arranged to count the number of said clock pulses in response to the output signal of said comparator;
   (g) a latch arranged to latch the count of said counter and to reset the latched count to zero in response to the output signal from said comparator.

4. Apparatus as claimed in any one of claims 1, 2 or 3, further comprising:
   (a) a memory for temporarily storing the directory of information to be renewed, said directory being read out from said directory region of said optical disc;

(b) means for changing the directory stored in said memory;

(k) means for writing the changed directory on said directory region, at the end of prewritten directories.

5. Apparatus as claimed in any one of claims 1, 2 or 3, wherein said sixth means comprises a d.c. signal generator so that said laser light beam is modulated to have a constant intensity for superposing writing with which prewritten information is substantially erased.

6. Apparatus as claimed in any one of claims 1, 2 or 3, wherein said sixth means comprises an a.c. signal generator so that said laser light beam is modulated in such a manner that the length of a pit made on said disc by irradiating said laser light beam modulated by said superposing writing signal is greater than the twice the shortest pit made by said laser light beam modulated by said information signal so that prewritten information is substantially erased by said laser light beam modulated by said superposing writing signal.

7. A method of renewing information prewritten on an optical disc having guide grooves each divided into a plurality of sectors, said disc also having a file region for recording information therein and a directory region for recording a directory of said file region therein, said file region including a plurality of said sectors, comprising the steps of:

(a) searching a directory of a file carrying a disignated data to be renewed;

(b) reading out said data to renew the same;

(c) storing said directory in a memory;

(d) erasing said data prewritten in said file by irradiating a laser light beam modulated by a predetermined superposing writing signal, which is a d.c. or a.c. signal having a constant waveform, on a sector or sectors corresponding to said file;

(e) searching the last position of data prewritten on said disc, such that a sector or sectors whose contents were erased are detected to be skipped;

(f) writing the renewed data in an unused region which follows said last position;

(g) renewing the directory stored in said memory so that a new directory designates the position where said renewed data has been written;

(h) searching the last position of directories which are prewritten in said directory region; and (i) writing said new directory at an unused region in said directory region which follows said last position of directories.

8. A method of renewing information prewritten on an optical disc having guide grooves each divided into a plurality of sectors, said disc also having a file region for recording information therein and a directory region for recording a directory of said file region therein, said file region including a plurality of said sectors, comprising the steps of:

(a) searching a directory of a file carrying a designated data to be renewed;

(b) reading out said data to renew the same;

(c) storing said directory in a memory;

(d) erasing said directory prewritten in said directory region by irradiating a laser light beam modulated by a predetermined superposing writing signal, which is a d.c. or a.c. signal having a constant waveform, on a sector or sectors corresponding to said directory;

(e) searching the last position of data prewritten on said disc, such that a sector or sectors whose contents were erased are detected to be skipped;

(f) writing the renewed data in an unused region which follows said last position;

(g) renewing the directory stored in said memory so that a new directory designates the position where said renewed data has been written;

(h) searching the last position of directories which are prewritten in said directory region; and (i) writing said new directory at an unused region in said directory region which follows said last position of directories.

9. A method of reading out information prewritten on an optical disc having a file region and a directory region, comprising the steps of:

(a) detecting a reproduced signal to check an envelope thereof;

(b) ascertaining whether information in a region can or cannot be read out;

(c) skipping said region to ascertain whether information in another region can be read out upon determining that information has been erased from the region and that information cannot be read out from said region; and (d) reading out information from said region upon ascertaining that information in said region can be read out.

10. A method for simulating erasure of optically encoded information on an optical disc comprising the steps of:

(a) preventing readout of the information to be erased by application of a modulated laser light beam in superposition with data encoded on said disc, and (b) updating a directory on said optical disc identifying the erased information to identify instead any renewed information representative thereof.

11. A method as recited in claim 10 wherein said step of preventing readout of the information comprises the step of superposing the modulated laser light beam on the information to be erased to make said information unreadable.

12. A method as recited in claim 10 wherein said step of preventing readout of the information comprises the step of providing substitute information therefor together with superposition of a modulated laser light beam on said directory for updating said directory, thereby to direct reading requests for the original information to said substitute information.

13. A method as recited in claim 10 including the further step of detecting whether information in a region of said optical disc has been erased and for skipping an erased region during a readout of the disc.

14. A method as recited in claim 13 wherein said step of detecting comprises the step of distinguishing between erased and unerased regions by envelope detection for said region.

* * * * *